(12) United States Patent
Moton et al.

(10) Patent No.: US 7,418,096 B2
(45) Date of Patent: *Aug. 26, 2008

(54) VOICE CALLER ID

(75) Inventors: Robert T. Moton, Alpharetta, GA (US);
Mark J. Enzmann, Roswell, GA (US);
Samuel N. Zellner, Dunwoody, GA (US)

(73) Assignee: AT&T Intellectual Property I, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/249,552

(22) Filed: Oct. 13, 2005

(65) Prior Publication Data

US 2006/0029209 A1 Feb. 9, 2006

Related U.S. Application Data

(63) Continuation of application No. 10/032,724, filed on Dec. 27, 2001, now Pat. No. 7,315,618.

(51) Int. Cl.
*H04M 1/00* (2006.01)

(52) U.S. Cl. .................................. 379/373.01

(58) Field of Classification Search .......... None
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |

(Continued)

FOREIGN PATENT DOCUMENTS

EP 0821511 1/1998

(Continued)

OTHER PUBLICATIONS

AASTRA Telecom, Press Release, Aastra Telecom Introduces CNX Conference Bridge, Aug. 29, 2005, 1 page.

(Continued)

*Primary Examiner*—Ramnandan Singh
(74) *Attorney, Agent, or Firm*—Cantor Colburn LLP

(57) ABSTRACT

An apparatus and method for audibly annunciating at a device information transmitted over a telephone network. The information is transmitted in the form of a modulated signal to the device wherein the modulated signal is representative of the information. The apparatus includes a receiver for capturing a ring signal and a modulated signal representative of information transmitted over a telephone network during an interval between the ring signal and a subsequent ring signal; a converter in communication with the receiver for converting the modulated signal into a stream of audible signals; and a speaker in communication with the converter for producing audible sounds corresponding to the stream of audible signals representative of the information received over the telephone network.

17 Claims, 6 Drawing Sheets

U.S. PATENT DOCUMENTS

| | | | |
|---|---|---|---|
| 4,817,133 A | 3/1989 | Takahashi et al. | |
| 4,823,304 A | 4/1989 | Frantz et al. | |
| 4,845,743 A | 7/1989 | Lutz | |
| 4,850,013 A | 7/1989 | Rose | |
| 4,850,103 A | 7/1989 | Takemoto et al. | |
| 4,995,075 A | 2/1991 | Angiolillo-Bent et al. | |
| 5,029,196 A | 7/1991 | Morganstein | |
| 5,109,405 A | 4/1992 | Morganstein | |
| 5,121,423 A | 6/1992 | Morihiro et al. | |
| 5,151,929 A | 9/1992 | Wolf | |
| 5,157,712 A | 10/1992 | Wallen, Jr. | |
| 5,161,181 A | 11/1992 | Zwick | |
| 5,200,994 A | 4/1993 | Sasano et al. | |
| 5,206,901 A | 4/1993 | Harlow et al. | |
| D338,889 S | 8/1993 | Fuqua et al. | |
| 5,260,987 A | 11/1993 | Mauger | |
| 5,263,084 A | 11/1993 | Chaput et al. | |
| 5,265,145 A | 11/1993 | Lim | |
| 5,274,699 A | 12/1993 | Ranz | |
| 5,278,894 A | 1/1994 | Shaw | |
| 5,289,542 A | 2/1994 | Kessler | |
| 5,315,650 A | 5/1994 | Smith et al. | |
| 5,329,578 A | 7/1994 | Brennan et al. | |
| 5,333,152 A | 7/1994 | Wilber | |
| 5,338,889 A | 8/1994 | Vora et al. | |
| 5,341,411 A | 8/1994 | Hashimoto | |
| 5,347,574 A | 9/1994 | Morganstein | |
| 5,361,295 A | 11/1994 | Solomon et al. | |
| 5,383,466 A | 1/1995 | Partika | |
| 5,386,460 A | 1/1995 | Boakes et al. | |
| 5,388,150 A | 2/1995 | Schneyer et al. | |
| 5,413,605 A | 5/1995 | Ashby et al. | |
| 5,420,910 A | 5/1995 | Rudokas et al. | |
| 5,420,914 A | 5/1995 | Blumhardt | |
| 5,420,920 A | 5/1995 | Capper et al. | |
| 5,425,076 A | 6/1995 | Knippelmier | |
| 5,425,089 A | 6/1995 | Chan et al. | |
| 5,430,719 A | 7/1995 | Weisser, Jr. | |
| 5,452,089 A | 9/1995 | Bushman | |
| 5,452,346 A | 9/1995 | Miyamoto | |
| 5,459,779 A | 10/1995 | Backaus et al. | |
| 5,466,785 A | 11/1995 | De Framond | |
| 5,467,388 A | 11/1995 | Redd, Jr. et al. | |
| 5,475,748 A | 12/1995 | Jones et al. | |
| 5,481,594 A | 1/1996 | Shen et al. | |
| 5,481,599 A | 1/1996 | MacAllister et al. | |
| 5,481,602 A | 1/1996 | Griffiths et al. | |
| 5,490,205 A | 2/1996 | Kondo et al. | |
| 5,497,414 A | 3/1996 | Bartholomew | |
| 5,502,762 A | 3/1996 | Andrew et al. | |
| 5,506,893 A | 4/1996 | Buscher et al. | |
| 5,511,111 A | 4/1996 | Serbetcioglu et al. | |
| 5,530,741 A | 6/1996 | Rubin | |
| 5,533,106 A | 7/1996 | Blumhardt | |
| 5,535,265 A | 7/1996 | Suwandhaputra | |
| 5,546,447 A | 8/1996 | Skarbo et al. | |
| 5,550,900 A | 8/1996 | Ensor et al. | |
| 5,550,905 A | 8/1996 | Silverman | |
| 5,563,935 A | 10/1996 | Small | |
| 5,563,936 A | 10/1996 | Washington | |
| 5,602,908 A | 2/1997 | Fan | |
| 5,608,788 A | 3/1997 | Demlow et al. | |
| 5,619,561 A | 4/1997 | Reese | |
| 5,631,950 A | 5/1997 | Brown | |
| 5,636,269 A | 6/1997 | Eisdorfer | |
| 5,644,629 A | 7/1997 | Chow | |
| 5,646,979 A | 7/1997 | Knuth | |
| 5,657,372 A | 8/1997 | Ahlberg et al. | |
| D383,466 S | 9/1997 | Burrell et al. | |
| 5,668,852 A | 9/1997 | Holmes | |
| 5,696,809 A | 12/1997 | Voit | |
| 5,696,815 A | 12/1997 | Smyk | |
| 5,699,413 A | 12/1997 | Sridhar | |
| 5,699,523 A | 12/1997 | Li et al. | |
| 5,701,301 A | 12/1997 | Weisser, Jr. | |
| 5,703,934 A | 12/1997 | Zicker et al. | |
| H1714 H | 3/1998 | Partridge, III | |
| 5,724,412 A | 3/1998 | Srinivasan | |
| 5,734,706 A | 3/1998 | Windsor et al. | |
| 5,754,635 A | 5/1998 | Kim | |
| 5,754,636 A | 5/1998 | Bayless et al. | |
| 5,754,775 A | 5/1998 | Adamson et al. | |
| 5,771,281 A | 6/1998 | Batten, Jr. | |
| 5,771,283 A | 6/1998 | Chang et al. | |
| 5,781,621 A | 7/1998 | Lim et al. | |
| 5,784,444 A | 7/1998 | Snyder et al. | |
| 5,796,806 A | 8/1998 | Birckbichler | |
| 5,799,072 A | 8/1998 | Vulcan et al. | |
| 5,802,160 A | 9/1998 | Kugell et al. | |
| 5,802,251 A | 9/1998 | Cohen et al. | |
| 5,805,587 A | 9/1998 | Norris et al. | |
| 5,805,682 A | 9/1998 | Voit et al. | |
| 5,805,997 A | 9/1998 | Farris | |
| 5,809,128 A | 9/1998 | McMullin | |
| 5,812,533 A | 9/1998 | Cox et al. | |
| 5,812,649 A | 9/1998 | Shen | |
| 5,838,774 A | 11/1998 | Weisser, Jr. | |
| 5,841,838 A | 11/1998 | Itoh et al. | |
| 5,841,850 A | 11/1998 | Fan | |
| 5,848,142 A | 12/1998 | Yaker | |
| 5,850,435 A | 12/1998 | Devillier | |
| 5,850,436 A | 12/1998 | Rosen et al. | |
| 5,857,017 A | 1/1999 | Ohi | |
| 5,859,903 A | 1/1999 | Lee | |
| 5,872,834 A | 2/1999 | Teitelbaum | |
| 5,872,934 A | 2/1999 | Whitehouse et al. | |
| 5,878,036 A | 3/1999 | Spartz et al. | |
| 5,883,942 A | 3/1999 | Lim et al. | |
| 5,884,144 A | 3/1999 | Chavez, Jr. et al. | |
| 5,894,504 A | 4/1999 | Alfred et al. | |
| 5,901,209 A | 5/1999 | Tannenbaum et al. | |
| 5,901,212 A | 5/1999 | True et al. | |
| 5,903,636 A | 5/1999 | Malik | |
| 5,905,794 A | 5/1999 | Gunn et al. | |
| 5,907,596 A | 5/1999 | Karnowski | |
| 5,907,604 A | 5/1999 | Hsu | |
| 5,915,000 A | 6/1999 | Nguyen et al. | |
| 5,917,817 A | 6/1999 | Dunn et al. | |
| 5,923,744 A | 7/1999 | Cheng et al. | |
| 5,930,701 A | 7/1999 | Skog | |
| 5,940,484 A | 8/1999 | DeFazio et al. | |
| 5,943,416 A | 8/1999 | Gisby | |
| 5,946,363 A | 8/1999 | Rominger et al. | |
| 5,946,636 A | 8/1999 | Uyeno et al. | |
| 5,946,684 A | 8/1999 | Lund | |
| D413,605 S | 9/1999 | Thomas et al. | |
| 5,948,040 A | 9/1999 | DeLorme et al. | |
| 5,948,061 A | 9/1999 | Merriman et al. | |
| 5,949,865 A | 9/1999 | Fusinato | |
| 5,953,399 A | 9/1999 | Farris et al. | |
| 5,953,657 A | 9/1999 | Ghisler | |
| 5,963,626 A | 10/1999 | Nabkel | |
| 5,969,647 A | 10/1999 | Mou et al. | |
| 5,970,127 A | 10/1999 | Smith et al. | |
| 5,970,128 A | 10/1999 | Kim | |
| 5,974,309 A | 10/1999 | Foti | |
| 5,982,866 A | 11/1999 | Kowalski | |
| 5,991,377 A | 11/1999 | Malik | |
| 5,999,207 A | 12/1999 | Rodriguez et al. | |
| 5,999,599 A | 12/1999 | Shaffer et al. | |
| 5,999,613 A | 12/1999 | Nabkel et al. | |
| 6,006,087 A | 12/1999 | Amin | |
| 6,009,321 A | 12/1999 | Wang et al. | |
| 6,014,559 A | 1/2000 | Amin | |

| | | | |
|---|---|---|---|
| 6,016,512 A | 1/2000 | Huitema | |
| 6,021,188 A | 2/2000 | Meg | |
| 6,021,427 A | 2/2000 | Spagna et al. | |
| 6,031,899 A | 2/2000 | Wu | |
| 6,044,148 A * | 3/2000 | Bleile | 379/373.02 |
| 6,049,291 A | 4/2000 | Kikinis | |
| 6,058,171 A | 5/2000 | Hoopes | |
| 6,061,434 A | 5/2000 | Corbett | |
| 6,061,566 A | 5/2000 | Friman | |
| 6,064,876 A | 5/2000 | Ishida et al. | |
| 6,065,844 A | 5/2000 | Chen | |
| 6,072,859 A * | 6/2000 | Kong | 379/142.01 |
| 6,078,581 A | 6/2000 | Shtivelman et al. | |
| 6,091,947 A | 7/2000 | Sumner et al. | |
| 6,094,478 A | 7/2000 | Shepherd et al. | |
| 6,094,573 A | 7/2000 | Heinonen et al. | |
| 6,094,574 A | 7/2000 | Vance et al. | |
| 6,094,575 A | 7/2000 | Anderson et al. | |
| 6,101,246 A | 8/2000 | Heinmiller et al. | |
| 6,104,784 A | 8/2000 | Robbins et al. | |
| 6,104,800 A | 8/2000 | Benson | |
| 6,108,630 A | 8/2000 | Kuechlet et al. | |
| 6,111,939 A | 8/2000 | Brabanec | |
| 6,134,235 A | 10/2000 | Goldman et al. | |
| 6,134,311 A | 10/2000 | Ekstrom | |
| 6,137,870 A | 10/2000 | Scherer | |
| 6,137,871 A | 10/2000 | Maier et al. | |
| 6,141,341 A | 10/2000 | Jones et al. | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | |
| 6,163,691 A | 12/2000 | Buettner et al. | |
| 6,167,254 A | 12/2000 | Chavez, Jr. et al. | |
| 6,173,049 B1 | 1/2001 | Malik | |
| 6,178,232 B1 | 1/2001 | Latter et al. | |
| 6,181,928 B1 | 1/2001 | Moon | |
| D437,879 S | 2/2001 | Weinandt | |
| 6,185,289 B1 | 2/2001 | Hetz et al. | |
| 6,192,115 B1 | 2/2001 | Toy et al. | |
| 6,192,116 B1 | 2/2001 | Mayak | |
| 6,198,480 B1 | 3/2001 | Cotugno et al. | |
| 6,198,920 B1 | 3/2001 | Doviak et al. | |
| 6,202,023 B1 | 3/2001 | Hancock et al. | |
| 6,219,407 B1 | 4/2001 | Kanevsky et al. | |
| 6,226,367 B1 | 5/2001 | Smith et al. | |
| 6,226,369 B1 | 5/2001 | Lim et al. | |
| 6,226,399 B1 | 5/2001 | Robinson | |
| 6,230,006 B1 | 5/2001 | Keenan et al. | |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang et al. | |
| 6,252,952 B1 | 6/2001 | Kung et al. | |
| 6,256,671 B1 | 7/2001 | Strentzch et al. | |
| 6,262,987 B1 | 7/2001 | Mogul | |
| 6,266,399 B1 | 7/2001 | Weller et al. | |
| 6,278,704 B1 | 8/2001 | Creamer et al. | |
| 6,278,862 B1 | 8/2001 | Henderson | |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,295,502 B1 | 9/2001 | Hancock et al. | |
| 6,301,350 B1 | 10/2001 | Henningson et al. | |
| 6,304,644 B2 * | 10/2001 | Karnowski | 379/156 |
| 6,310,943 B1 | 10/2001 | Kowakski | |
| 6,311,057 B1 | 10/2001 | Barvesten | |
| 6,317,488 B1 | 11/2001 | DePond et al. | |
| 6,317,781 B1 | 11/2001 | De Boor et al. | |
| 6,324,263 B1 | 11/2001 | Sherwood et al. | |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,979 B1 | 1/2002 | Nakayasu | |
| 6,339,639 B1 * | 1/2002 | Henderson | 379/142.08 |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,411 B1 | 3/2002 | Dugan et al. | |
| 6,363,664 B1 | 4/2002 | Brutsaert | |
| 6,366,661 B1 | 4/2002 | Devillier et al. | |
| 6,366,772 B1 | 4/2002 | Arnson | |
| 6,377,807 B1 | 4/2002 | Iparrea et al. | |
| 6,377,979 B1 | 4/2002 | Yamashita et al. | |
| 6,389,124 B1 | 5/2002 | Schnarel et al. | |
| 6,400,809 B1 | 6/2002 | Bossemeyer, Jr. et al. | |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | |
| 6,422,263 B1 | 7/2002 | Spicer | |
| 6,427,003 B1 | 7/2002 | Corbett et al. | |
| 6,427,064 B1 | 7/2002 | Henderson | |
| 6,434,394 B1 * | 8/2002 | Grundvig et al. | 455/463 |
| 6,437,879 B1 | 8/2002 | Temple | |
| 6,438,216 B1 | 8/2002 | Aktas | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | |
| 6,462,646 B2 | 10/2002 | Helferich | |
| 6,466,653 B1 * | 10/2002 | Hamrick et al. | 379/67.1 |
| 6,477,246 B1 | 11/2002 | Dolan et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | |
| 6,493,439 B2 | 12/2002 | Lung et al. | |
| 6,494,953 B2 | 12/2002 | Hayes et al. | |
| 6,496,569 B2 | 12/2002 | Pelletier et al. | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |
| 6,542,586 B1 | 4/2003 | Helstab | |
| 6,542,591 B1 | 4/2003 | Amro et al. | |
| 6,542,602 B1 | 4/2003 | Elazar | |
| 6,542,812 B1 | 4/2003 | Obradovich et al. | |
| 6,546,092 B2 | 4/2003 | Corbett et al. | |
| 6,549,621 B1 | 4/2003 | Christie, IV et al. | |
| 6,553,110 B1 | 4/2003 | Peng | |
| 6,553,221 B2 | 4/2003 | Nakamura et al. | |
| 6,556,540 B1 | 4/2003 | Mawhinney et al. | |
| 6,560,317 B1 | 5/2003 | Quagliana | |
| 6,560,327 B1 | 5/2003 | McConnell | |
| 6,566,995 B2 | 5/2003 | Furuuchi et al. | |
| 6,570,971 B2 | 5/2003 | Latter et al. | |
| 6,570,974 B1 | 5/2003 | Gerszberg et al. | |
| 6,574,319 B2 | 6/2003 | Latter et al. | |

| | | |
|---|---|---|
| 6,580,904 B2 | 6/2003 | Cox et al. |
| 6,584,490 B1 | 6/2003 | Schuster et al. |
| 6,587,458 B1 | 7/2003 | Burg et al. |
| 6,597,905 B1 | 7/2003 | Hijii |
| 6,603,840 B2 | 8/2003 | Fellingham et al. |
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,388 B2 | 12/2003 | Bedingfield |
| 6,665,715 B1 | 12/2003 | Houri |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,757,530 B2 | 6/2004 | Rouse et al. |
| 6,757,740 B1 | 6/2004 | Parekh et al. |
| 6,765,998 B2 | 7/2004 | Bruce et al. |
| D494,953 S | 8/2004 | Leung |
| 6,771,956 B1 | 8/2004 | Beeler |
| 6,775,366 B1 | 8/2004 | Cobbett et al. |
| 6,775,371 B2 | 8/2004 | Elsey et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,879 B1 | 9/2004 | Beham |
| 6,804,503 B2 | 10/2004 | Shohara et al. |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,271 B1 | 11/2004 | Kanabar et al. |
| 6,826,617 B1 | 11/2004 | Ansell et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,868,155 B1 | 3/2005 | Cannon et al. |
| 6,871,076 B2 | 3/2005 | Samn |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,137 B2 | 6/2005 | Brandt et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,020,250 B2 | 3/2006 | Lew et al. |
| 7,027,408 B2 | 4/2006 | Nabkel et al. |
| 7,076,051 B2 | 7/2006 | Brown et al. |
| 7,079,837 B1 | 7/2006 | Sherman et al. |
| 7,085,358 B2 | 8/2006 | Ruckart et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,103,662 B2 | 9/2006 | Ray et al. |
| 7,107,077 B2 | 9/2006 | Lee |
| 7,113,577 B2 | 9/2006 | Cook et al. |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 7,184,533 B1 | 2/2007 | Shaffer et al. |
| 7,269,249 B2 * | 9/2007 | Woodring ................ 379/93.17 |
| 2001/0005854 A1 | 6/2001 | Murata et al. |
| 2001/0036174 A1 | 11/2001 | Herring |
| 2001/0044898 A1 | 11/2001 | Benussi et al. |
| 2002/0009184 A1 | 1/2002 | Shnier |
| 2002/0016748 A1 | 2/2002 | Emodi et al. |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0183098 A1 | 12/2002 | Lee et al. |
| 2002/0188443 A1 | 12/2002 | Reddy et al. |
| 2003/0012353 A1 | 1/2003 | Tang et al. |
| 2003/0016143 A1 | 1/2003 | Ghazarian |
| 2003/0016800 A1 | 1/2003 | Fukuda |
| 2003/0026416 A1 | 2/2003 | Fusco |
| 2003/0032414 A1 | 2/2003 | Melaku et al. |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0068020 A1 * | 4/2003 | Hamrick et al. .......... 379/88.21 |
| 2003/0078081 A1 * | 4/2003 | Schmier .................... 455/567 |
| 2003/0092384 A1 | 5/2003 | Ross, III |
| 2003/0092432 A1 | 5/2003 | Hwang |
| 2003/0112938 A1 | 6/2003 | Kanakubo et al. |
| 2003/0133553 A1 | 7/2003 | Kahkoo et al. |
| 2003/0133653 A1 | 7/2003 | De Barros et al. |
| 2003/0135562 A1 | 7/2003 | Himmel et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0196206 A1 | 10/2003 | Shusman |
| 2003/0198322 A1 | 10/2003 | White, Jr. |
| 2003/0219107 A1 | 11/2003 | Richardson et al. |
| 2004/0049545 A1 | 3/2004 | Lockridge et al. |
| 2004/0101118 A1 | 5/2004 | Powell |
| 2004/0101124 A1 | 5/2004 | Koch et al. |

| | | |
|---|---|---|
| 2004/0109558 A1 | 6/2004 | Koch |
| 2004/0114730 A1 | 6/2004 | Koch et al. |
| 2004/0120475 A1 | 6/2004 | Bauer et al. |
| 2004/0125929 A1 | 7/2004 | Pope |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |
| 2004/0209605 A1 | 10/2004 | Urban et al. |
| 2004/0209640 A1 | 10/2004 | Urban et al. |
| 2004/0213207 A1 | 10/2004 | Silver et al. |
| 2004/0233892 A1 | 11/2004 | Roberts et al. |
| 2004/0242212 A1 | 12/2004 | Bacon et al. |
| 2004/0248560 A1 | 12/2004 | Bedingfield, Sr. |
| 2005/0073999 A1 | 4/2005 | Koch |
| 2005/0100158 A1 | 5/2005 | Kreiner et al. |
| 2005/0107074 A1 | 5/2005 | Zellner |
| 2005/0147228 A1 | 7/2005 | Perrella et al. |
| 2006/0002540 A1 | 1/2006 | Kreiner et al. |
| 2006/0013375 A1 | 1/2006 | Smith et al. |
| 2006/0029209 A1 | 2/2006 | Moton et al. |
| 2006/0152207 A1 | 7/2006 | Riebel et al. |
| 2006/0153173 A1 | 7/2006 | Beck et al. |
| 2007/0064911 A1 | 3/2007 | Bedingfield, Sr. et al. |

FOREIGN PATENT DOCUMENTS

| | | |
|---|---|---|
| KR | 2002014945 | 2/2002 |
| WO | 03/030501 A1 | 4/2003 |
| WO | 03/030502 A1 | 4/2003 |
| WO | 03/090432 A1 | 10/2003 |

OTHER PUBLICATIONS

Address Allocation for Private Internets, Rekhter et al., pp. 1-8, Feb. 1996.
Bellcore Specification TR-NWT-000310, Calling Number Delivery, Issue 4, Dec. 1992.
Bellcore Specification TR-NWT-001188, Calling Name Delivery Generic Requirements, Issue 1, Dec. 1991.
T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.
J. Boswell, G. Lingenauber, An Advanced HF Receiver Design, Jul. 1994, IEE, Conference Publication No. 392, pp. 41-47.
Mark H. Norris, Transmitter Architectures, 1998, IEE, pp. 4/1-4/6.
OKI Silicon Solutions Company, Japan Site, "Multi-Lingual Text-to-Speech Processor ML2110;" [online]; [retrieved on Aug. 31, 2005] retrieved from the Internet http://www.//oki.com/semi/English/m12110/htm.
RBS 884 Pico System Description, Author Unknown, Ericsson 1/1551-AE/LZB 119 2269 Uae Rev A, Apr. 23, 1998.
SIP: Session Initiation Protocol, Handley et al., Mar. 1999.
Slawson, "Caller ID Basics," [online]; [retrieved on Oct. 31, 2001]; retrieved from the Internet http://www.testmark.com/develop/tml_callerid_cnt.html.
SmartHome "The Caller ID System that Speaks for Itselfl;" [online]; [retrieved on Aug. 31, 2005]; retrieved from the Internet http://www.smarthome.com/5154.html.
SmartHome "The Caller ID System that Speaks of Itself! Talking Caller ID;" [online]; [retrieved on Nov. 5, 2001]; retrieved from the Internet http://www.smarthome.com/5154.html.
"Talking Caller ID by Stealth Software;" [online]; [retrieved on Nov. 5, 2001]; retrieved from the Internet http://www.talkingcallerid.com/.
The IP Network Address Translator (NAT), Egevang et al., May 1994.
"Time Division Multiple Access (TDMA);" [online]; [retrieved on Mar. 6, 2003]; retrieved from the Internet http://www.jec.org/online/tutorials/tdma/.
"Venture IP Telephone System" AASTRA [online]; [retrieved on Aug. 31, 2001]; retrieved from the Internet http://www.aastra.com/products/callerids/voicecallerid/be-6060.html.
"Venture IP Telephone System" AASTRA; [online]; [retrieved on Nov. 5, 2001]; retrieved from the Internet http://www.aastra.com/products/callerids/voicecallerid/be-6090.html.
Voice-9090, "Talking Caller ID", Aastra Telecom-Talking Caller ID-Voice 9090 [online]; [retrieved on Nov. 5, 2001]; http://www.aastra.com/products/callerids/voicecallerid/be-9090.html.

* cited by examiner

VOICE CALLER ID

RELATED CASES

The present application is a continuation of U.S. application Ser. No. 10/032,724, entitled VOICE CALLER ID, and filed on Dec. 27, 2001 now U.S. Pat. No. 7,315,618.

BACKGROUND

1. Technical Field

The invention relates generally to telephones and more particularly to audibly annunciating information at a telephone or in proximity of a telephone.

2. Description of the Related Art

Caller Identification (hereinafter "caller ID") is a feature provided by local phone companies that sends information from the telephone network to a telephone device between the first and second rings. The information that is sent varies. It generally includes, however, the calling telephone number and the name of the caller. This information is sent via the telephone line in a digital data packet that is usually Frequency Shift Keyed (hereinafter "FSK") modulated. At the receiving telephone device the subscriber must be signed up for the caller ID service and must have a caller ID data receiver, i.e., a caller ID unit, connected to the telephone line in order to receive the digital data packet containing the caller ID information for the calling telephone device. The data receiver receives the FSK modulated digital data packet and provides a visual display of the information. In operation, the caller ID unit receives the FSK modulated digital data packet, demodulates it and converts the information into a stream of text characters that is then displayed, for example, on a liquid crystal display (LCD) provided either on the caller ID unit or which is integral to the telephone device itself. As discussed before, for an incoming call, the caller ID information that is displayed at the receiving side can include the name and number of the calling party among other types of information. The central office must have "caller ID capability" and the service must be enabled within the central office of the local telephone exchange. If, however, the central office does not have caller ID capability, the called party will receive a variety of messages including, for example, "out of area."

Among the information that is displayed on the caller ID unit is the originating telephone number and the name listed in the directory under that number. In other words, the name that is displayed is the name that the telephone company has entered into a database and believes to be that of its customer. The number in the local central office database also aids another database lookup and thus associates the name in the directory with the number from where the call originates. The calling party's name and number information is transmitted through the central office and the telecommunication network and ultimately is displayed at the caller ID unit or on the telephone device itself. As discussed hereinbefore, such caller ID information is generally transmitted and displayed between the first and second rings. For caller ID to work properly in a telecommunication environment, the telecommunication network switches must be supported by Common Channel Signaling (CCS) and the party initiating the call must originate it from a single-channel line, a multi-channel trunk line with ANI/Calling Party ID. Further, if the originating line or caller blocks the transmission of the caller ID information, the receiving party will not be able to view the information or the receiving device will display, for example, "ANONYMOUS," "NOT AVAILABLE" or "PRIVATE CALLER."

Now turning to FIG. 1, one example of a caller ID system 10 is illustrated generally. The system 10 includes a calling telephone device 12 connected to a first central office switch 18 that originates a call to a first receiving telephone device 14 connected to a second central office switch 20. The call propagates through a telecommunication network 16 that provides a connection between the first central office switch 18 and the second central office switch 20. The receiving telephone device 14 includes a conventional caller ID unit 22 that is separate and detached from the telephone device 14.

FIG. 2 illustrates one embodiment of a conventional caller ID unit 22. The caller ID unit 22 can include, for example, a telephone line interface circuit 36, a demodulator circuit 38, a control circuit 40 and an alphanumeric display 42. The control circuit 40 can be a single chip computer or can be implemented using discrete integrated circuits depending on the specific application. The control circuit 40 includes, in the most general sense, a microprocessor 44, a memory circuit 46 and a read only memory circuit 48 (ROM). The control circuit 40 also includes a universal asynchronous receiver transmitter 52 (UART) and a baud rate generator 53. Also included are an address bus 50 and a data bus 54 for interconnecting the various units as shown and an address decoder 49 for selecting various peripheral devices that the control circuit 40 interfaces with such as, for example, the alphanumeric display 42.

In operation the caller ID unit 22 receives FSK modulated caller ID signals during an interval between intermittent ringing signals from the central office switch 20. The FSK modulated caller ID signals contain, for example, a channel seizure stream that is followed by a mark stream and then the actual caller ID information. The caller ID information can be sent in a Single Data Message Format (hereinafter "SDMF") containing the calling number or in a Multiple Data Message Format (hereinafter "MDMF") containing the calling number and the name associated with that number. The number and name fields may contain additional data to indicate that the caller has blocked the information or that the information is not available. The additional data includes, for example, single bit markers that are interpreted for display.

The FSK modulated caller ID signals are received at the tip 32 and ring 34 side of the telephone line. These signals are then passed through the telephone line interface circuit 36 where they are filtered and amplified. The filtered and amplified signals are then coupled to the FSK demodulator circuit 38 where the modulated signals are converted to a serial bit stream representation of the caller ID data message. The serial bit stream is then fed to the UART 52, which converts the serial bit stream into a parallel bit format. The parallel bit formatted stream is interpreted as a series of characters comprising the caller ID information data by the microprocessor 44. The microprocessor 44 then periodically updates the alphanumeric display 42 with each character comprising the parallel bit formatted stream. For additional information regarding the caller ID unit 22, reference is made to U.S. Pat. No. 4,582,956 to Doughty, which is herein incorporated by reference in its entirety.

Over the years the value of the caller ID unit 22 has been shadowed by the fact that the caller ID information is only provided to the recipient in the form of a visual display. The visual display of the caller ID information has much less value to the recipient if he or she happens to be out of the immediate vicinity of the display. For example, if the recipient is in another room and the telephone rings, the recipient must first locate the caller ID unit 22 before he or she can identify the caller. To address this need, several talking caller ID devices exist. Such devices, however, are not an integral part of the telephone and thus add to the number of appliances a user has to purchase and maintain. The talking caller ID devices do not provide a real-time announcement of the caller ID information and rely mainly on prerecorded messages and pre-stored information such as known telephone numbers. Furthermore, the talking caller ID devices do not provide a telephone ring signal capturing function such that the telephone remains silent until the talking caller ID device has received an entire caller ID information stream.

Therefore, there is a need in the art for an apparatus, system and method for communicating the caller ID information to a recipient in a format other than a visual display that is provided as an integral part of a telephone device. There is also a need to provide the caller ID information in a real-time format as the information is transmitted from the caller without relying on prerecorded messages and pre-stored information such as known telephone numbers. Furthermore, there is a need in the art for a telephone ring signal capturing function such that the caller ID device captures and holds the telephone ring signals until an entire caller ID information stream has been received.

SUMMARY

According to one aspect, the invention provides an apparatus for audibly annunciating at a device information transmitted over a telephone network, the information being transmitted in the form of a modulated signal to the device wherein the modulated signal is representative of the information. The apparatus includes a receiver for capturing a ring signal and a modulated signal representative of information transmitted over a telephone network during an interval between the ring signal and a subsequent ring signal; a converter in communication with the receiver for converting the modulated signal into a stream of audible signals; and a speaker in communication with the converter for producing audible sounds corresponding to the stream of audible signals representative of the information received over the telephone network.

Another aspect of the invention provides a telephone. The telephone includes an apparatus for audibly annunciating at a device information transmitted over a telephone network, the information being transmitted in the form of a modulated signal to the device wherein the modulated signal is representative of the information. The apparatus includes a receiver for receiving a modulated signal representative of information transmitted over a telephone network during an interval between ringing signals; a converter in communication with the receiver for converting the modulated signal into a stream of audible signals; and a speaker in communication with the converter for producing audible sounds corresponding to the stream of audible signals representative of the information received over the telephone network.

A further aspect of the invention provides a method for audibly annunciating at a device information transmitted over a telephone network, the information being transmitted in the form of a modulated signal to the device wherein the modulated signal is representative of the information. The method includes receiving a modulated signal representative of information transmitted over a telephone network during an interval between the ring signal and a subsequent ring signal; converting the modulated signal into a stream of audible signals; and providing the stream of audible signals to a speaker in communication with the converter for producing audible sounds corresponding to the stream of audible signals representative of the information received over the telephone network.

Yet another aspect of the invention provides an apparatus for audibly annunciating at a device information transmitted over a telephone network, the information being transmitted in the form of a modulated signal to the device wherein the modulated signal is representative of the information. The apparatus includes means for capturing a ring signal and a modulated signal representative of information transmitted over a telephone network during an interval between the ring signal and a subsequent ring signal; means for converting the modulated signal into a stream of audible signals in communication with the means for capturing; and means for producing audible sounds corresponding to the stream of audible signals representative of the information received over the telephone network in communication with the converter.

Still another aspect of the invention provides a telephone. The telephone includes means for audibly annunciating at a device information transmitted over a telephone network, the information being transmitted in the form of a modulated signal to the device wherein the modulated signal is representative of the information. The means for audibly annunciating includes means for receiving a modulated signal representative of information transmitted over a telephone network during an interval between ringing signals; means for converting the modulated signal into a stream of audible signals in communication with the means for receiving; and means for producing audible sounds corresponding to the stream of audible signals representative of the information received over the telephone network in communication with the converter.

Yet a further aspect of the invention provides a system for audibly annunciating at a device information transmitted over a telephone network, the information being transmitted in the form of a modulated signal to the device wherein the modulated signal is representative of the information. The system includes means for capturing at a receiver a ring signal from a telephone network; means for receiving a modulated signal representative of information transmitted over a telephone network during an interval between the ring signal and a subsequent ring signal; means for converting the modulated signal into a stream of audible signals; and means for providing the stream of audible signals to a speaker in communication with the converter for producing audible sounds corresponding to the stream of audible signals representative of the information received over the telephone network.

According to another aspect, the invention provides an apparatus for audibly annunciating at a device information transmitted over a telephone network, the information being transmitted in the form of a modulated signal to the device wherein the modulated signal is representative of the information. The apparatus includes a receiver for capturing a ring signal and a modulated signal representative of information transmitted over a telephone network during an interval between the ring signal and a subsequent ring signal, the receiver providing the subsequent ring signal to a telephone ringer after receiving the modulated signal; a converter in communication with the receiver for converting the modulated signal into a stream of audible signals; and a speaker in communication with the converter for producing audible sounds corresponding to the stream of audible signals representative of the information received over the telephone network.

Yet another aspect of the invention provides a telephone. The telephone includes an apparatus for audibly annunciating at a device information transmitted over a telephone network, the information being transmitted in the form of a modulated signal to the device wherein the modulated signal is representative of the information. The apparatus includes a receiver for receiving a modulated signal representative of information transmitted over a telephone network during an interval between ringing signals, the receiver providing the subsequent ring signal to a telephone ringer after receiving the modulated signal; a converter in communication with the receiver for converting the modulated signal into a stream of audible signals; and a speaker in communication with the converter for producing audible sounds corresponding to the stream of audible signals representative of the information received over the telephone network.

A further aspect of the invention provides a method for audibly annunciating at a device information transmitted over a telephone network, the information being transmitted in the form of a modulated signal to the device wherein the modulated signal is representative of the information. The method includes capturing at a receiver a ring signal from a telephone network; receiving a modulated signal representative of information transmitted over a telephone network during an interval between the ring signal and a subsequent ring signal; converting the modulated signal into a stream of audible signals; providing the stream of audible signals to a speaker in communication with the converter for producing audible sounds corresponding to the stream of audible signals representative of the information received over the telephone network; and providing the subsequent ring signal to a telephone ringer after receiving the modulated signal.

Still yet another aspect of the invention provides an apparatus for audibly annunciating at a device information transmitted over a telephone network, the information being transmitted in the form of a modulated signal to the device wherein the modulated signal is representative of the information. The apparatus includes means for capturing a ring signal and a modulated signal representative of information transmitted over a telephone network during an interval between the ring signal and a subsequent ring signal, the means for capturing providing the subsequent ring signal to a telephone ringer after receiving the modulated signal; means for converting the modulated signal into a stream of audible signals in communication with the means for capturing; and means for producing audible sounds corresponding to the stream of audible signals representative of the information received over the telephone network in communication with the converter.

Still a further aspect of the invention provides a telephone. The telephone includes means for audibly annunciating at a device information transmitted over a telephone network, the information being transmitted in the form of a modulated signal to the device wherein the modulated signal is representative of the information. The means for audibly annunciating includes means for receiving a modulated signal representative of information transmitted over a telephone network during an interval between ringing signals, the means for receiving providing the subsequent ring signal to a telephone ringer after receiving the modulated signal; means for converting the modulated signal into a stream of audible signals in communication with the means for receiving; and means for producing audible sounds corresponding to the stream of audible signals representative of the information received over the telephone network in communication with the converter.

Yet a further aspect of the invention provides a system for audibly annunciating at a device information transmitted over a telephone network, the information being transmitted in the form of a modulated signal to the device wherein the modulated signal is representative of the information. The system includes means for capturing at a receiver a ring signal from a telephone network; means for receiving a modulated signal representative of information transmitted over a telephone network during an interval between the ring signal and a subsequent ring signal; means for converting the modulated signal into a stream of audible signals; means for providing the stream of audible signals to a speaker in communication with the converter for producing audible sounds corresponding to the stream of audible signals representative of the information received over the telephone network; and means for providing the subsequent ring signal to a telephone ringer after receiving the modulated signal.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there are illustrated and described specific examples of an apparatus, system and method in accordance with the invention.

BRIEF DESCRIPTION OF THE DRAWINGS

Advantages of the invention may be better understood by referring to the following description taken in conjunction with the accompanying drawings, in which.

DESCRIPTION

Figure 1:
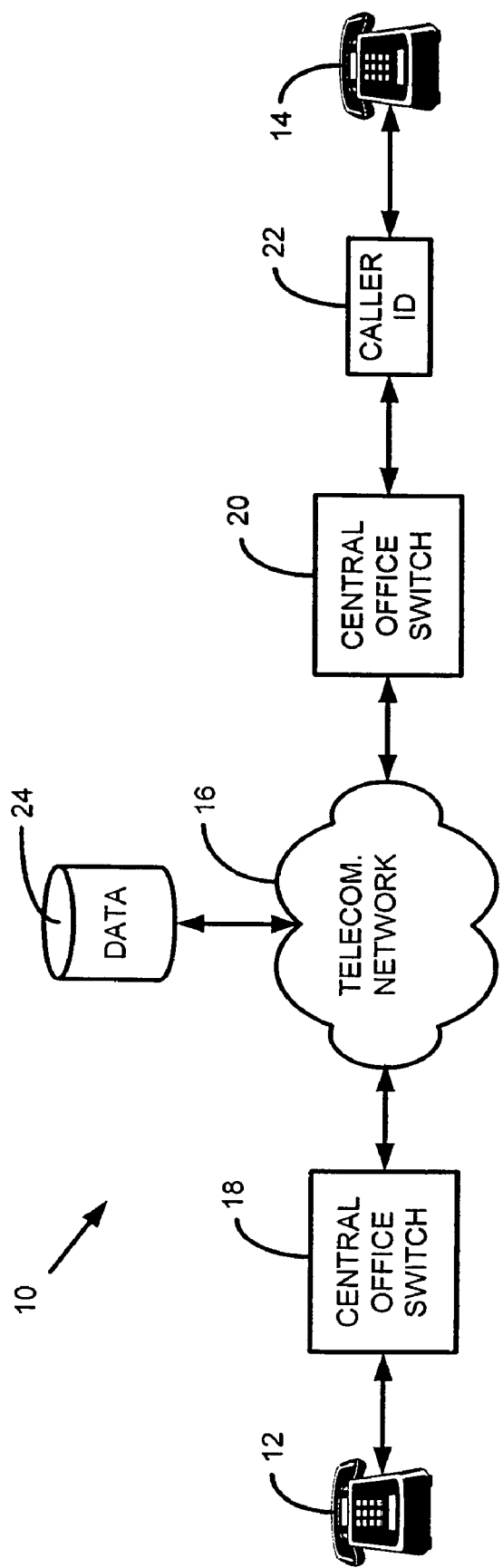
FIG. 1 illustrates a related art caller ID system.
Figure 2:
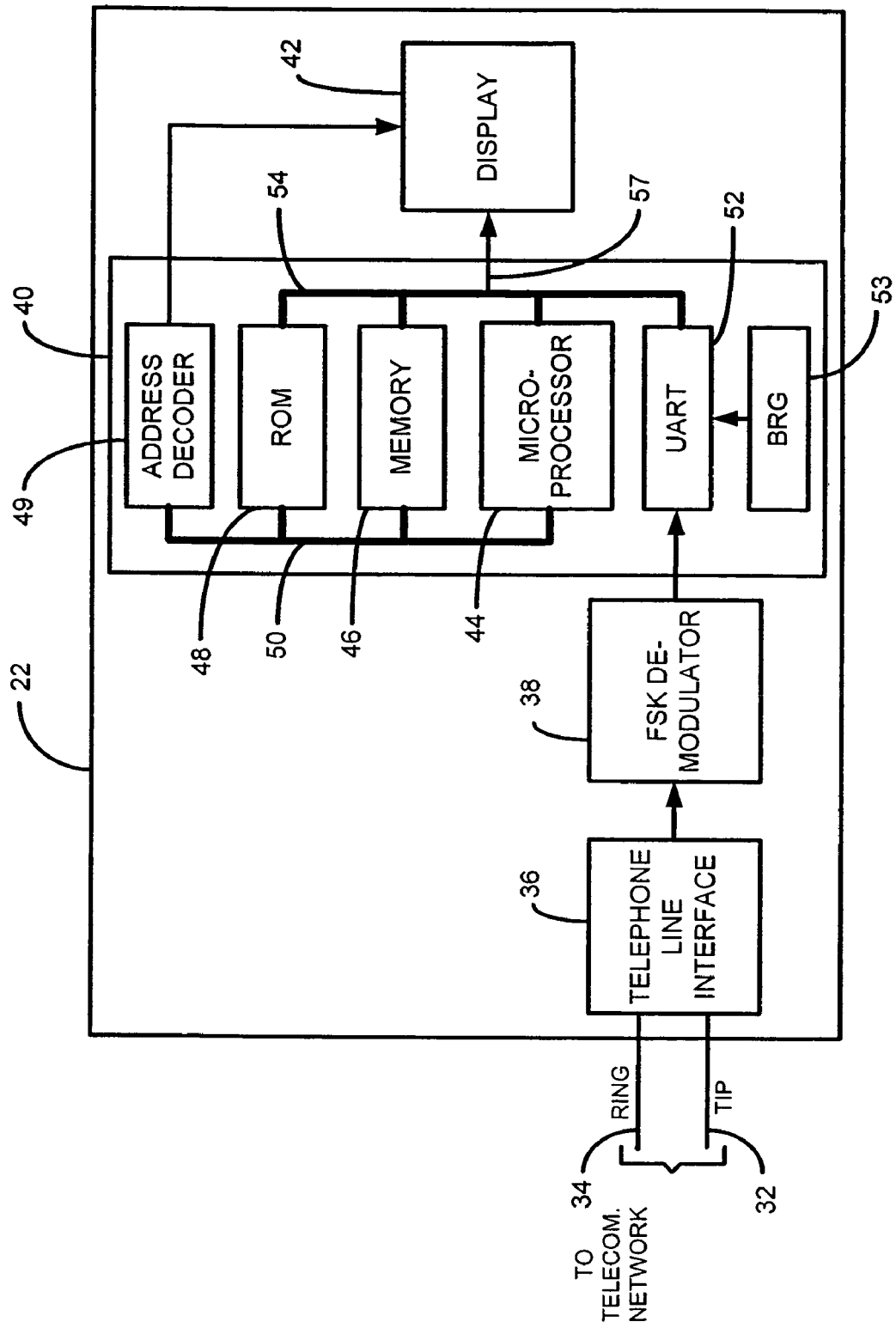
FIG. 2 illustrates a related art conventional caller ID unit.

Turning now to the drawings, wherein like reference numerals refer to like elements, the various embodiments of the invention are illustrated as being implemented in a suitable general-purpose environment. In one embodiment, although not necessarily limited to such environment, the invention comprises in the general context an apparatus comprising a text-to-speech converter for audibly annunciating in real-time caller ID information at a device such as, for example, a receiving telephone. In one form, one embodiment of the invention includes a text-to-speech converter unit in combination with a conventional caller ID unit 22.

Figure 3:
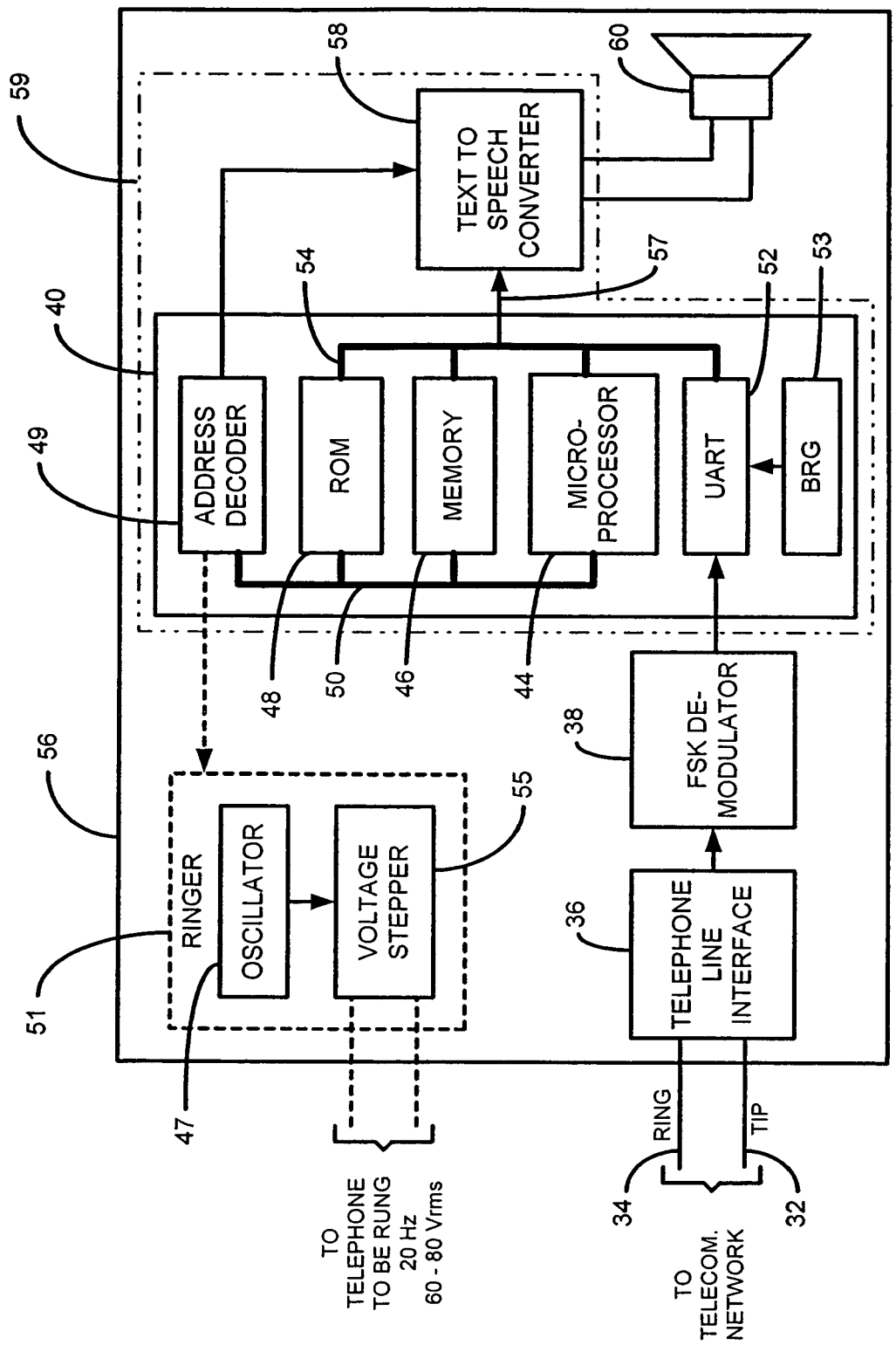
FIG. 3 illustrates one embodiment of a caller ID unit according to the present invention.

FIG. 3 illustrates one embodiment of a voice caller ID unit 56. In one embodiment, the voice caller ID unit 56 comprises a telephone line interface circuit 36 connected to the tip 32 and ring 34 lines of the telephone line, an FSK demodulator circuit 38, a control circuit 40 and a text-to-speech converter 58. The text-to-speech converter 58 outputs an audio signal to a speaker 60 corresponding to a digital input signal, for example, such as an incoming digitally formatted caller ID information stream. In one embodiment, the text-to-speech converter 58 processes the incoming caller ID information stream in real-time as it is being transmitted by the caller. The control circuit 40 can be realized as a single chip computer or can be realized using discrete integrated circuits depending on the particular application. The control circuit 40 includes in the most general sense a microprocessor 44, a memory circuit 46 and a ROM circuit 48. The control circuit 40 also includes a UART 52 and baud rate generator 53 (BRG). Also included in the control circuit 40 are an address bus 50 and a data bus 54 for interconnecting the various units as shown and an address decoder 49 for selecting various peripheral devices that the control circuit 40 interfaces with such as, for example, the text-to-speech converter 58.

In one embodiment the control circuit 40 is configured such that the voice caller ID unit 56 can capture and hold the ring signals from the telephone line as well as the caller ID information relating to the originating telephone device 12. For example, in one embodiment the voice caller ID unit 56 captures an incoming telephone ring signal to prevent the telephone device from ringing. The control circuit 40 can be programmed so as to provide the ring signal to the telephone device after the entire caller ID information stream has been captured, annunciated, stored, displayed, etc. In one embodiment, this function can be realized by providing a separate ringer circuit 51. The ringer circuit 51 starts an oscillator 47 after receiving an enable signal from the address decoder 49 when the control circuit 40 has collected the entire caller ID information stream. In one embodiment, the output of the oscillator 47 can be provided to a voltage stepper circuit 55 to generate a 60-80 $V_{RMS}$ signal at 20 Hz., for example, if the ringer circuit 51 is to drive a conventional ringer. Otherwise, in one embodiment, the output of the oscillator 47 can be provided to a logic circuit for generating ringing tones or ringing pulses for a solid-state buzzer or a piezoelectric type ringer.

One embodiment of the voice caller ID unit 56, among others, comprises a stand-alone text-to-speech converter 58 such as, for example, a Multi-Lingual Text-to-Speech Processor ML1510, manufactured by OKI SILICON SOLUTIONS COMPANY. The stand-alone text-to-speech converter 58 can provide less complex functionality or more complex functionality than the ML1510 depending on the specific implementation of the invention, without departing from the scope of the invention. For a further description of the ML1510 reference is made to http://www.oki.com/semi/english/ml1510.htm (visited Nov. 1, 2001) the contents of which are incorporated herein by reference in its entirety. Those skilled in the art will appreciate, however, that there are a number of off-the-shelf text-to-speech converters that may form a portion of the present invention without departing from its scope.

Furthermore, those skilled in the art will appreciate that a version of the text-to-speech converter 58 can be realized in the form of a single chip micro-computer using current integrated circuit manufacturing technology for purposes of implementing a voice caller ID apparatus according to the present invention, without departing from the scope of the present invention. In one embodiment, the text-to-speech converter 58 can include for example a microprocessor 44 or micro-controller and a digital-to analog converter (hereinafter "DAC"). In addition, the text-to-speech converter 58 can include a dictionary stored in a nonvolatile memory such as the ROM circuit 48 and various temporary data or character storage registers in the memory circuit 46. Data input into the text-to-speech converter 58 can be in the form of, for example, standard ASCII data, 8-bit DOS data or ISO8859-1, and other suitable forms of text formats. Speech output can be provided, for example, by an internal DAC or can be provided in digital form for interfacing with other digital systems.

One embodiment of a single chip integrated computer for implementing a text-to-speech converter 58 comprises a central processing unit (CPU) based on, for example, MOTOROLA 6000 series or INTEL 8000 series microprocessors and micro-controllers, and a DAC. Additional varieties of microprocessor and micro-controller architectures that are well known to those skilled in the art can be utilized without limiting the scope of the invention. Also, a custom application specific integrated circuit (ASIC) can be used for implementing the functionality of the text-to-speech 58 without departing from the scope of the invention.

In one embodiment, a single integrated circuit 59 can be used to combine the caller ID decoding function and the text-to-speech conversion function. Accordingly, in one embodiment the text-to-speech converter 58 and the control circuit 40 can be integrated in a single integrated circuit 59 utilizing conventional integration technology. The integrated circuit 59 as well as the text-to-speech converter 58 can be realized using single-chip computers comprising more advanced microprocessor and micro-controller devices having additional features such as 16 and 32 bit architectures, additional ROM space, dynamic RAM interfaces, 12 bit DACs, serial and parallel interfaces, programmable timers, speech registers, digital signal output registers and the like. In one embodiment, of the single chip computer, the ROM circuit 48 can provide 16K of memory space, the memory circuit 46 can provide 16K or 32K of RAM memory space and so on, depending on the complexity of the executable instructions (firmware) required for a specific embodiment of the invention. Furthermore, a single chip-computer also can include one or more buffers such as, for example, eight buffer slots in a stack and the like.

In one embodiment, the FSK demodulator circuit 38 also can be integrated in a single-chip integrated circuit to provide an even higher level of integration, thus reducing the size and cost of the voice caller ID unit 56. Those skilled in the art will appreciate that the entire voice caller ID unit 56 can be manufactured as a single integrated circuit including, for example, the telephone line interface circuit 36 and the ringer circuit 51.

As discussed above the caller ID information relating to the originating telephone device 12 can include the originating telephone number and the name associated with that number that is stored in the directory database 24 in communication with the telecommunication network 16. Those skilled in the art will appreciate that the stream of text characters can be captured at line 57 by the text-to-speech converter 58 which subsequently converts the text characters into a humanly cognizable audible stream of sounds relating to the incoming digitally formatted caller ID information. In operation the caller ID unit 22 receives FSK modulated caller ID signals during an interval between intermittent ringing signals from the central office switch 20. In one embodiment the caller ID information can include, the FSK modulated caller ID signals containing, for example, a channel seizure stream that is followed by a mark stream and then the actual caller ID information. The caller ID information can be sent in a Single Data Message Format (SDMF) containing the calling number or the Multiple Data Message Format (MDMF) containing the calling number and the name associated with that number. The number and name fields may contain additional data for indicating that the caller has blocked the information or that the information is not available. The caller ID information, however, also can include a variety of information especially as local exchange switches and signaling systems become more complex and provide additional features and functionality. Accordingly, the scope of the invention should not be considered to be limited to any specific message, text or character stream format or content.

The functionality of one embodiment of the text-to-speech converter 58 is generally well known by those skilled in the art. For illustration purposes only, one embodiment of the text-to-speech converter 58 will be described in general terms. Those skilled in the art will appreciate, however, that the invention should not be considered to be limited thereto. Accordingly, in one embodiment the text-to-speech converter 58 can provide one or more levels of text-to-speech synthesis, including converting an electronically formatted text input stream, such as a stream of ASCII characters, and converting the text stream into humanly recognizable speech comprising sentences, words, phrases and syllables. The conversion process can be implemented by way of custom computation algorithms stored in the ROM circuit 50, for example. When executed the computation algorithm can thus model human speech based on phonemes comprising various syllables and diphones, for example.

In one embodiment, the speech synthesis also can be based on pre-stored words or phrases, for example. Transitions between phonemes may or may not be considered by the computational algorithm. If not considered, the processing of the phoneme parameters can result in poor quality speech. Therefore, in one embodiment, transitions can be stored in the ROM circuit 50 or the memory circuit 46 to provide a signal between adjacent phonemes, thereby joining two halves of the two separate phonemes into a single combination, generally referred to as a diphone, for example. The diphones can be utilized to generate a speech signal by the superposition of other diphones on phonemes in a similar way that natural speech is achieved. In one embodiment the speech can be achieved by a synthesis based on syllables, words or phrases at the cost of additional memory requirements. See for example, http://www.oki.com/semi/english/ml1510.htm (visited Nov. 1, 2001).

Figure 4:
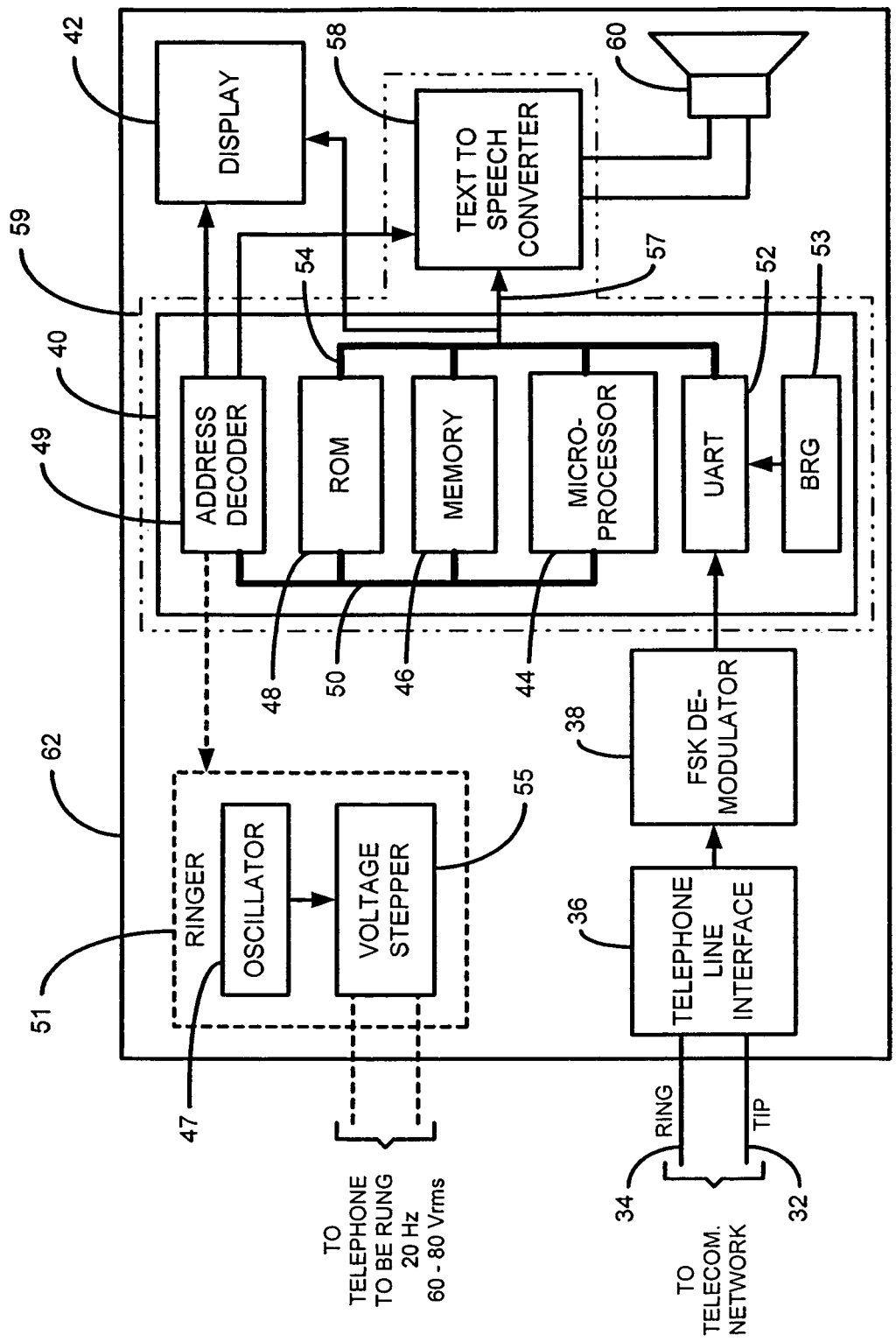
FIG. 4 illustrates one embodiment of a caller ID unit according to the present invention.

FIG. 4 illustrates one embodiment of a voice caller ID unit 62. As illustrated therein, one embodiment of the voice caller ID unit 62 generally includes the addition of the text-to-speech converter 58 to an existing conventional caller ID unit 22 by tapping the output line 57 of the control circuit 40 that passes the stream of text characters to the display 42. Accordingly, the stream of text characters is routed to the display 42 and is simultaneously routed to the text-to-speech converter 58, thus providing a synthesized humanly recognizable speech output at the speaker 60 as well as a visual output at the display 42.

Figure 5:
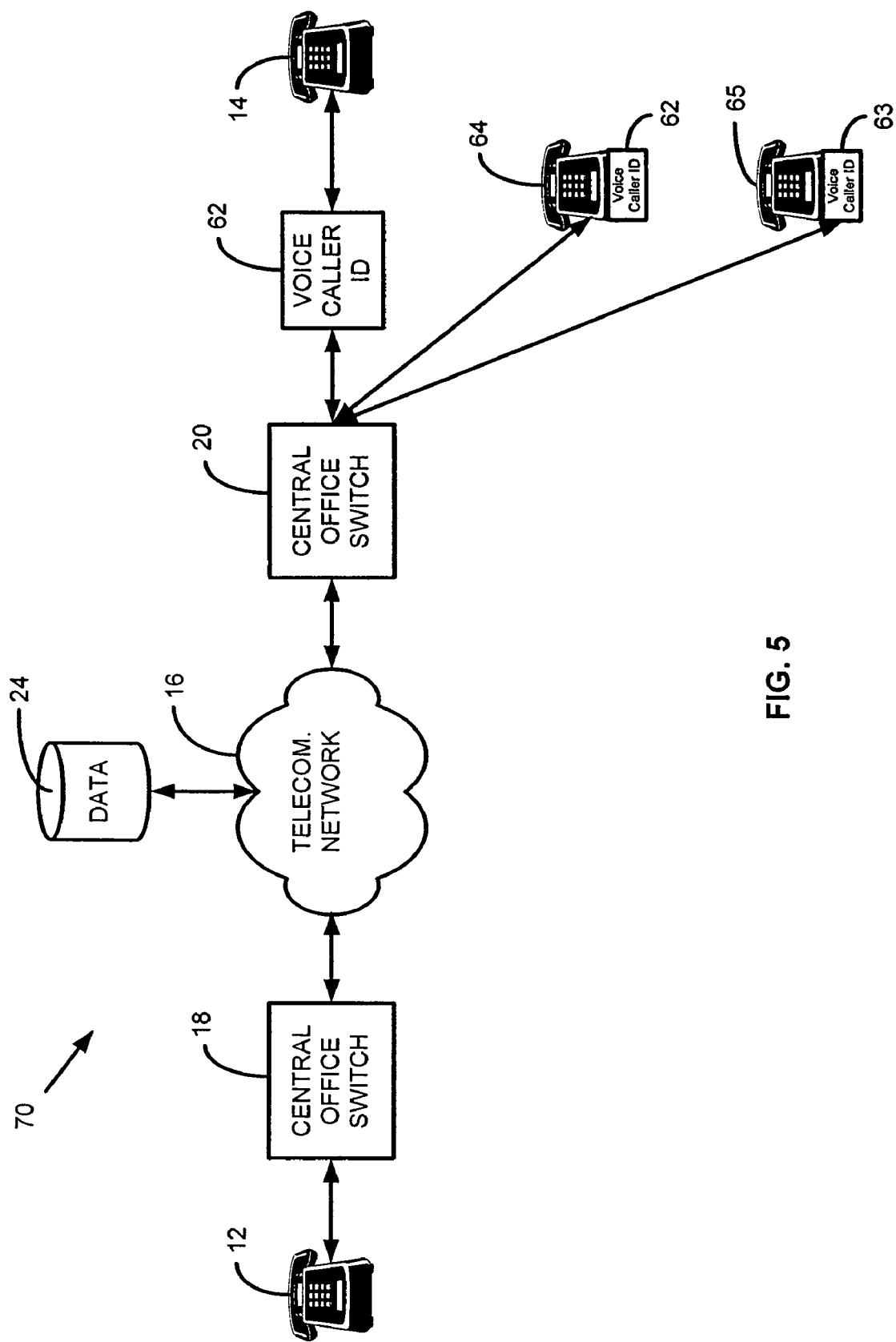
FIG. 5 illustrates one embodiment of a caller ID system according to the present invention.

FIG. 5 illustrates one embodiment of a system 70 for audibly announcing caller ID information and illustrating one environment for the voice caller ID unit 62. As described hereinbefore, the central office switch 20 transmits information relating to a calling telephone device 12 that originates a call to a first receiving telephone device 14. The call propagates through a telecommunication network 16 providing a connection between a first central office switch 18 to which the calling telephone device 12 is connected and a second central office switch 20 to which the first receiving telephone device 14 is connected. The first receiving telephone device 14 is shown herein connected to the voice caller ID unit 62, which is separate and detached from the telephone device 14. Another example includes a second receiving telephone device 64 having an integral voice caller ID unit 62. The second receiving telephone device 64 receives ring signals from the central office switch 20 and modulated caller ID information relating to, for example, the originating telephone device 12 and passes these signals through the telephone circuitry of the second receiving telephone device 64 to the voice caller ID unit 62.

In contrast, there is a third type of receiving telephone device 65 that includes an integral voice caller ID unit 63 for receiving the ring signals as well as the modulated caller ID information. Accordingly, the third receiving telephone device 65 can be utilized to capture the first ring and then capture the entire modulated caller ID information stream before passing the first ring signal to the third telephone device 65. In one embodiment, the third telephone device 65 can be adapted to operate in a GSM environment (GSM stands for Groupe Speciale Mobile, also known as Global System for Mobile Communication). Accordingly, ring signals are passed directly to the voice caller ID unit 63 rather than directly to the third telephone device 65. The voice caller ID unit 63 traps the ring signals, thus keeping the third telephone device 65 quiet while the voice caller ID unit 63 receives all of the caller ID information. The voice caller ID unit 63 releases the ring signals to the third telephone device 65 once it has received the entire stream of caller ID information, for example. The caller ID information is then processed through the voice caller ID unit 63 that outputs an audible annunciation of the caller ID information. The ring circuit 51 can be used to output the ring signal to the telephone device 65 when the control circuit 40 enables it via the address decoder 49, for example.

Figure 6:
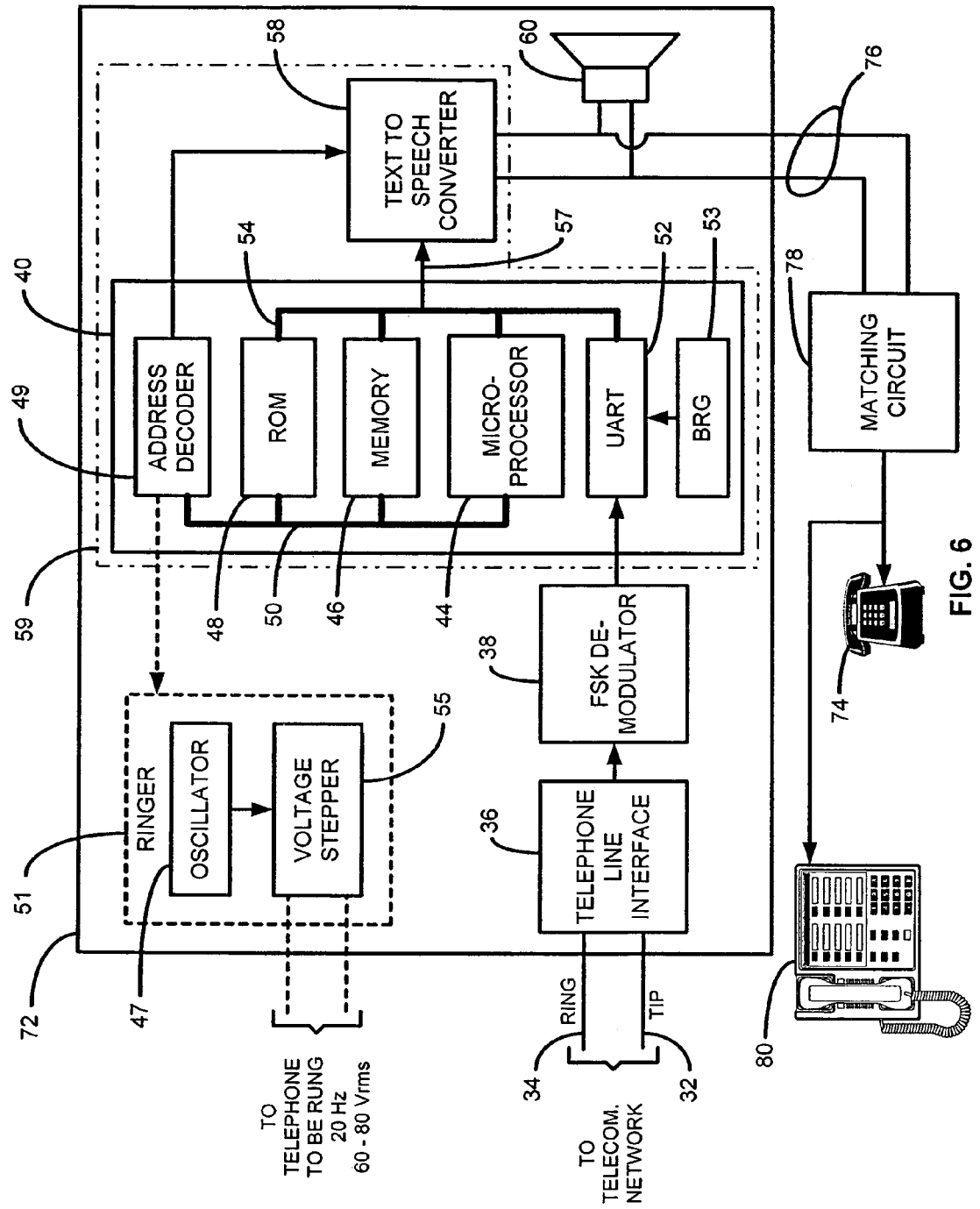
FIG. 6 illustrates one embodiment of a caller ID unit according to the present invention.

Turning now to FIG. 6, where one embodiment of a voice caller ID unit 72 is illustrated. In one embodiment, the voice caller ID unit 72 can be used in conjunction with an advanced call-waiting service for annunciating a number while the user is already using the telephone device 74. The voice announcement can provide standard caller ID information in addition to the caller's telephone number over the voice caller ID unit 72. The internal hardware connection for implementing one embodiment of the voice caller ID unit 72 is similar to the hardware currently provided with the advanced caller ID hardware. With the conventional caller ID display 42 the user can re-display the message from a call in order to re-read it, for example, while with the voice caller ID unit 72 the user can re-route the audible speech signal to the speaker in the telephone's 74 handset.

In one embodiment, the audio channel output 76 of the text-to-speech converter 58 can be routed to an existing telephone line within a facility or residence and re-route the audio channel output 76 from the text-to-speech converter 58 to the telephone's 74 handset or a speaker phone 80 of another telephone within the building or residence. Routing the audio signal back into the telephone's 74 handset may require, for example, one or more matching networks 78 having a high enough impedance to preserve the audio signal. One example of a matching network 78 that may be incorporated can be found in a product sold by BELL SOUTH normally referred to as a privacy director. The privacy director seizes the incoming call and routes it to a recording machine that plays a prerecorded announcement stored therein. The privacy director then connects to the number that has just called and plays back the recording. Because there is no other audio path the privacy director makes use of a bridge tap to closes the path to the incoming call and opens a path to the recording, for example.

Those skilled in the art will appreciate that to prevent unwanted annunciations, in the middle of the night for example, the voice caller ID unit 56, 62, 63, 72 can be adapted to work in conjunction with a scheduler. In addition, the voice caller ID unit 56, 62, 63, 72 also can be adapted with an ON/OFF switch to selectively engage the voice caller ID unit 56, 62, 63, 72. Furthermore, just as with the conventional caller ID unit 22, those skilled in the art will appreciate that the voice caller ID units 56, 62, 63, 72 can be filtered to block calls originating from certain numbers, or permit calls originating only from a list of predetermined numbers that can be entered into the memory circuit 46 of the voice caller ID unit 56, 62, 63, 72, for example.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. An apparatus for audibly annunciating information transmitted over a network using a signal representative of the information, the apparatus comprising:
    a receiver for receiving the signal representative of the information transmitted over the network, the signal comprising a stream of characters representative of the information;
    a control circuit for capturing a ring signal received from the network, wherein the receiver provides a subsequent ring signal to a telephone ringer after receiving the signal representative of the information transmitted over the network;
    a converter in communication with the receiver for converting the signal representative of the information into a stream of audio signals; and
    a speaker in communication with the converter for producing audible sounds corresponding to the stream of audio signals representative of the information received over the network,
    wherein the converter is in communication with one or more matching networks, the one or more matching networks operative to reroute and forward the stream of audio signals to a speaker in an alternative communication device.

2. The apparatus of claim 1, wherein the apparatus is adapted to operate in a wireless network environment.

3. The apparatus of claim 1, wherein the converter is a multi-lingual text-to-speech converter.

4. The apparatus of claim 1, wherein the apparatus is in communication with a telephone device.

5. The apparatus of claim 1 further comprising a memory circuit in communication with the receiver for storing the information.

6. The apparatus of claim 1 further comprising a processor for converting the signal into a stream of characters representative of the information.

7. The apparatus of claim 6 further comprising a memory circuit in communication with the processor, wherein the processor stores the stream of characters representative of the information in the memory circuit.

8. An apparatus for audibly annunciating information transmitted over a network using a signal representative of the information, comprising:
    a receiver for receiving the signal representative of the information transmitted over the network, the signal comprising a stream of characters representative of the information, the information being directed to a communication device;
    a control circuit for capturing a ring signal received from the network, wherein the receiver provides a subsequent ring signal to a telephone ringer after receiving the signal representative of the information transmitted over the network;
    a converter in communication with the receiver for converting the signal representative of the information into a stream of audio signals; and
    a speaker in communication with the converter for producing audible sounds corresponding to the stream of audio signals representative of the information received over the network, the speaker producing the audible sounds corresponding to the stream of audio signals during use of the communication device by a user.

9. The apparatus of claim 8, wherein the communication device is a telephone.

10. The apparatus of claim 8, wherein the apparatus is adapted to operate in a wireless network environment.

11. The apparatus of claim 8, wherein the converter is a multi-lingual text-to-speech converter.

12. The apparatus of claim 8 further comprising a processor for converting the signal into a stream of characters representative of the information.

13. The apparatus of claim 12 further comprising a memory circuit in communication with the processor, wherein the processor stores the stream of characters representative of the information in the memory circuit.

14. An apparatus for audibly annunciating information transmitted over a network using a signal representative of the information, comprising:
    a receiver for receiving the signal representative of the information transmitted over the network, the signal comprising a stream of characters representative of the information;
    a control circuit for capturing a ring signal received from the network, wherein the receiver provides a subsequent ring signal to a telephone ringer after receiving the signal representative of the information transmitted over the network;
    a converter in communication with the receiver for converting the signal representative of the information into a stream of audio signals, the audio signals comprising the stream of characters converted into at least one of words and phrases; and
    a speaker in communication with the converter for producing audible sounds corresponding to the stream of audio signals representative of the information received over the network.

15. The apparatus of claim 14, wherein the apparatus is adapted to operate in a wireless network environment.

16. The apparatus of claim 14, wherein the converter is a multi-lingual text-to-speech converter.

17. The apparatus of claim 14, wherein the apparatus is in communication with a telephone device.

* * * * *